(12) United States Patent
Schach et al.

(10) Patent No.: US 7,711,739 B2
(45) Date of Patent: May 4, 2010

(54) ENHANCING NODE-BASED QUERY LANGUAGES TO SUPPORT COMMON RELATIONAL MAPPING PATTERNS

(75) Inventors: David Schach, Redmond, WA (US); Henricus Johannes Maria Meijer, Mercer Island, WA (US); Avner Y. Aharoni, Seattle, WA (US); Adam J. Wiener, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 520 days.

(21) Appl. No.: 11/042,876

(22) Filed: Jan. 25, 2005

(65) Prior Publication Data

US 2006/0167867 A1 Jul. 27, 2006

(51) Int. Cl.
*G06F 17/30* (2006.01)

(52) U.S. Cl. ........................................ 707/754; 707/778

(58) Field of Classification Search ............... 707/2, 707/3, 4, 5, 7, 101, 103 R, 103 X, 103 Y, 707/103 Z, 100; 709/246
See application file for complete search history.

(56) References Cited

U.S. PATENT DOCUMENTS

| | | | |
|---|---|---|---|
| 6,529,901 B1 * | 3/2003 | Chaudhuri et al. | 707/3 |
| 7,054,877 B2 * | 5/2006 | Dettinger et al. | 707/101 |
| 7,149,746 B2 * | 12/2006 | Fagin et al. | 707/102 |
| 2004/0254924 A1 * | 12/2004 | Dettinger et al. | 707/4 |

* cited by examiner

*Primary Examiner*—Greta L Robinson
(74) *Attorney, Agent, or Firm*—Workman Nydegger

(57) ABSTRACT

The subject invention relates to systems and methods that augment node-based programming languages to facilitate efficient data manipulation of hierarchical data structures. In one aspect, a query or general purpose language system is provided. The system includes a query component to interact with hierarchical node-based data collections and a language extension component to augment the query component to facilitate interactions with the node-based data collections. The language extension component supplies various functions to filter the data collections at a granular level, re-shape the data collections, sort the data collections, or extend the data collections with computed nodes.

20 Claims, 13 Drawing Sheets

ENHANCING NODE-BASED QUERY LANGUAGES TO SUPPORT COMMON RELATIONAL MAPPING PATTERNS

TECHNICAL FIELD

The subject invention relates generally to computer systems, and more particularly, the subject invention relates to systems and methods that provide enhanced query operators to augment query or general purpose programming languages and to facilitate operations on collections of hierarchical values.

BACKGROUND OF THE INVENTION

As increasing amounts of information are stored, exchanged, and presented employing a node-based language such as XML, for example, the ability to intelligently query such data sources becomes progressively more important. For instance, one of the great strengths of XML is its flexibility in representing many different types of information from diverse sources. To exploit this flexibility, an XML programming language should at a minimum provide features for querying, retrieving, and interpreting information from these diverse sources.

A standard mechanism for querying XML documents employs the XPath language. However, XPath, as defined by the W3C XML Query Working Group, lacks a number of critical concepts required for practical application. For instance, XPath lacks the ability to filter data at a desired level of granularity, to easily re-shape the data, to sort the data, and to extend the data with computed nodes. XML Query (XQuery), attempts to address a number of these issues but imposes a heavy burden on the query developer and in many cases still suffers from some of the data manipulation shortcomings in XPath.

With respect to XQuery, it is designed to perform as a language in which queries are concise and easily understood. It is also flexible enough to query a broad spectrum of XML information sources, including both databases and documents. The Query Working Group has identified a requirement for both non-XML query syntax and XML-based query syntax, whereby XQuery is designed to meet the first of these requirements. In general, XQuery is derived from an XML language referred to as "Quilt", which in turn borrowed features from several other languages, including XPath, XQL, XML-QL, SQL, and OQL, for example.

The basic building block of XQuery is an expression, which is a string of characters. The language provides several types of expressions which may be constructed from keywords, symbols, and operands. In general, the operands of an expression are other expressions. Thus, XQuery is considered a functional language, which implies that expressions can be nested with full generality. However, unlike a pure functional language, it does not allow variable substitutability if the variable declaration contains construction of new nodes. Also, XQuery is a strongly-typed language in which the operands of various expressions, operators, and functions conform to the expected types.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to systems and methods for extending node-based query or general purpose programming languages to support common relational data mapping patterns. In one aspect, a plurality of operations are defined to support node-based query components that can be utilized to augment query and transformation languages which operate over hierarchical structures such as XML, for example, and/or other type objects. Although these operations are generally applicable to any language that operates on collections of hierarchical data (e.g., objects and nested relations), an XML data model and an XPath programming language can be employed as a particular example to illustrate the utility of enhanced language operators for various types of hierarchical data. The subject query enhancements facilitate various relational data mapping schemes that are not supported by conventional programming language systems.

In order to provide programming language enhancements for collections of hierarchical data, differing types of functionality are considered and defined. This functionality includes expanded sub-node predicate semantics, advanced node projections, the ability to derive information from computed nodes or selections, functions relating to node groupings or re-groupings, functions for node summaries, and node result sorting functionality. To support such functionality, various language extension operators are provided for manipulating hierarchical collections. These extensions can include an Only extension, an All extension, a Project extension, a Compute extension, a GroupBy extension, and a Sort extension, wherein such extensions can be employed with a query-based language such as XPath, for example, to facilitate extended or enhanced data manipulations of hierarchical data collections. By defining new query operators to augment languages that operate on collections of hierarchical values with a number of constructs, the subject invention dramatically reduces the work required of application developers to shape XML data (or other type) into a desired output format. This is particularly useful for defining queries over XML and/or object views over relational data.

To the accomplishment of the foregoing and related ends, certain illustrative aspects of the invention are described herein in connection with the following description and the annexed drawings. These aspects are indicative of various ways in which the invention may be practiced, all of which are intended to be covered by the subject invention. Other advantages and novel features of the invention may become apparent from the following detailed description of the invention when considered in conjunction with the drawings.

DETAILED DESCRIPTION OF THE INVENTION

The subject invention relates to systems and methods that augment node-based programming languages to facilitate efficient data manipulation of hierarchical data structures. In one aspect, a programming language system is provided. The system includes a query component (e.g., XPath or XQuery language component) to interact with hierarchical node-based data collections and a language extension component to augment the query component to facilitate interactions with the node-based data collections. The language extension component supplies various functions to filter the data collections at a granular level, re-shape the data collections, sort the data collections, or extend the data collections with computed nodes, for example.

As used in this application, the terms "component," "extension," "system," "object," "query," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
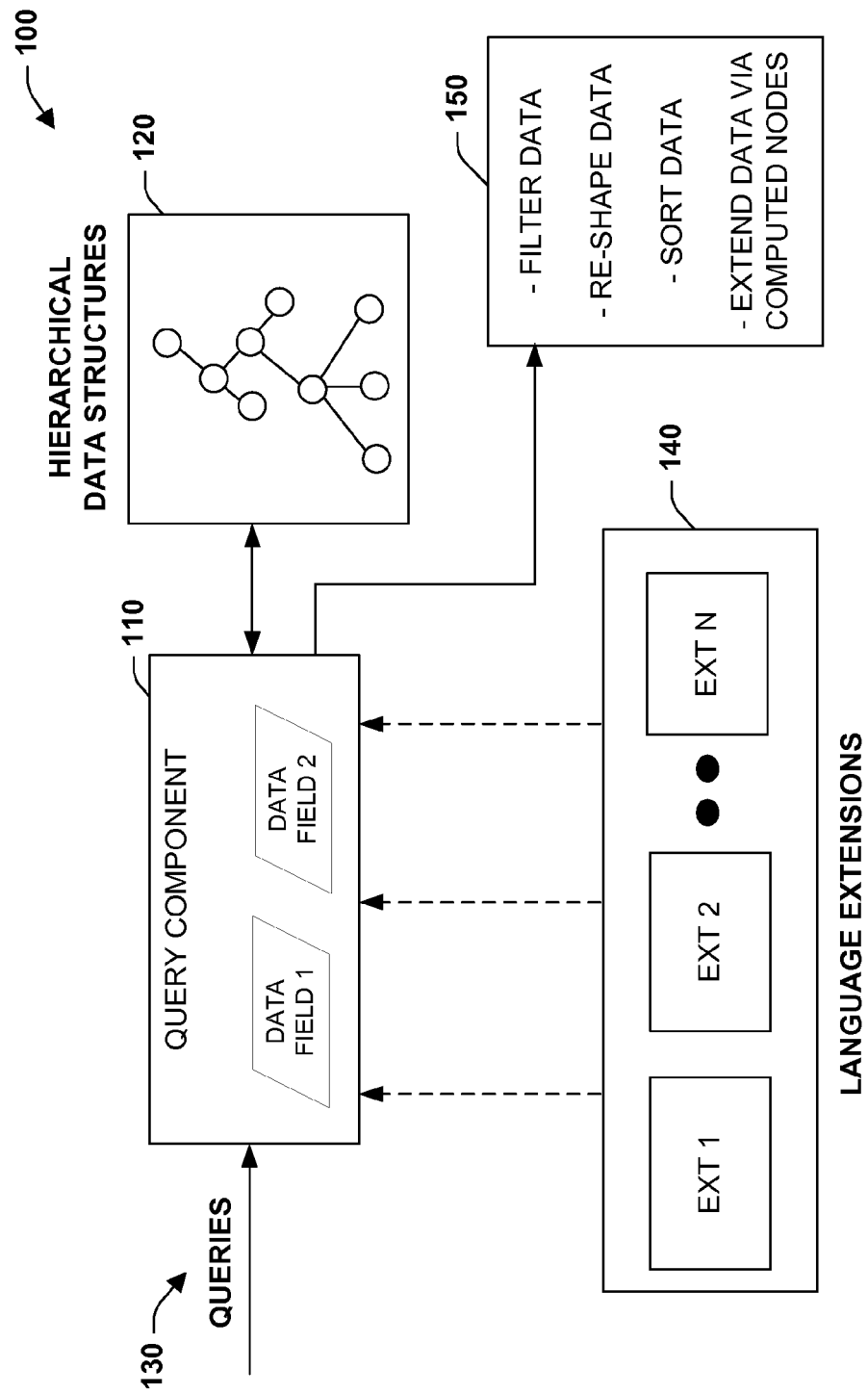
FIG. 1 is a schematic block diagram illustrating a query or general purpose programming language system in accordance with an aspect of the subject invention.

Referring initially to FIG. 1, a query or general purpose programming language system 100 is illustrated in accordance with an aspect of the subject invention. The system 100 includes a query component 110 that interacts with or manipulates data with respect to one or more hierarchical data structures 120 which are illustrated as a hierarchical collection of nodes (e.g., nodes of a relational database). The data structures 120 can be associated with substantially any collection of nodes such as XML data structures, Java structures, C++ structures, C# structures, SQL structures, and/or other hierarchically arranged node objects, for example. Generally, a query 130 (or queries) is directed to the query component 110 by a user or system to retrieve desired data in various formats from the data structures 120. The query component 110 can in one example be adapted as an XPath language component that supports XQueries, for example. It is to be appreciated however, that the query component 110 can be adapted according to substantially any language that operates on node-based data structures 120.

After the query 130 is submitted to the query component 110, data is retrieved and operated upon in accordance with one or more language extensions 140. Such extensions 140 enable the query component to present data as output to a user or system at 150 in various formats or collections. This includes filtering data in a more granular form than what is presently available with conventional language systems. For instance, this allows queries 130 to be more focused to retrieve desired data from the data structures 120 while not presenting extraneous or unrelated data at 150. Another feature of the language extensions 140 is that they enable re-shaping of data output 150 in a more straight-forward/efficient manner than conventional query systems. Other features of the extensions 140 include node sorting data options and node computing or sequencing that extend the capabilities of the query component 110. These features will be described in more detail below with respect to FIGS. 2 and 3.

In order to provide the extensions 140 for the query component 110, various functionalities are defined for the language extensions. This includes providing expanded sub-node predicate semantics such as returning a specific set of requested sub-nodes or returning data associated with all nodes defined for a set. Another functional aspect includes advanced node projections which include returning a sequence of nodes selected by the query 130. In yet another functional aspect, computed nodes are provided by the extensions 140 that allows extending a sequence of nodes that have content computed from one or more other nodes in the data structure 120. As will be described in more detail below, other functional components of the extensions 140 include node grouping options for re-grouping a sequence of nodes selected by the query 130, node summary options for calculating aggregate values across members of a group, and result sorting options for sorting a sequence of nodes.

Figure 2:
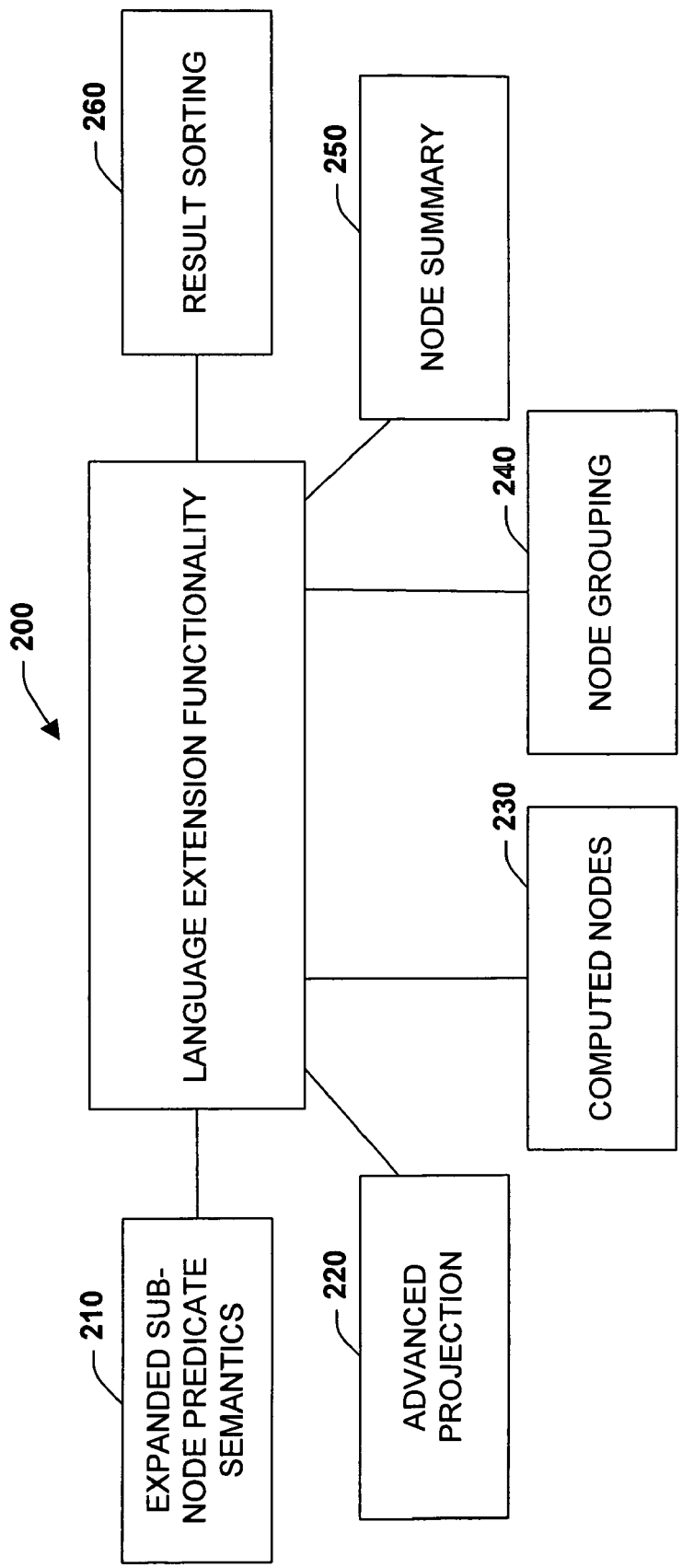
FIG. 2 is a block diagram illustrating exemplary language extension functionality in accordance with an aspect of the subject invention.
Figure 3:
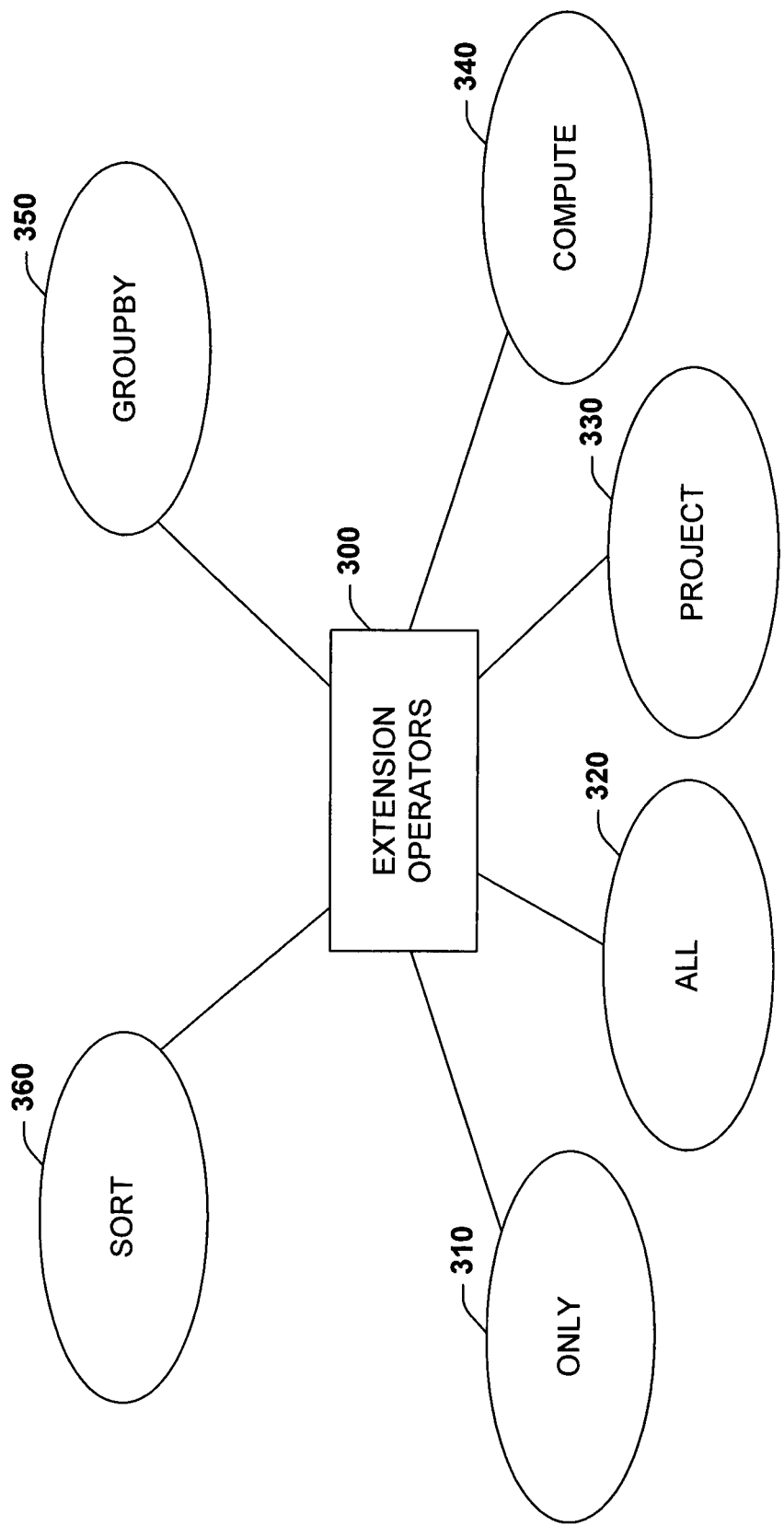
FIG. 3 illustrates exemplary extension operators in accordance with an aspect of the subject invention.

According to the above described functionality, various operators can be provided to facilitate the language extensions 140. These operators include an Only construct to narrow data searches to "only" those child nodes defined by a particular query 130. An All construct or operator can be provided to return a selected node only if "all" the child nodes in a selected sequence meet a given predicate criteria. A Project construct can be provided to specify explicitly which sub-nodes should be returned by the query 130. Other operators or constructs include a Compute operator that enables data to be viewed and determined by a return value of a function, a GroupBy operator that defines a node sequence to a group, and a Sort operator that defines a sequence of nodes to sort. FIGS. 2 and 3 below will illustrate and describe in more detail the above described functionality and associated operators to implement the functionality in accordance with the language extensions 140.

Referring now to FIG. 2, exemplary language extension functionality 200 is illustrated in accordance with an aspect of the subject invention. Before proceeding with a discussion of FIGS. 2 and 3, it is noted that the following discussion is described in the context of an example language XPath. As noted above however, it is to be appreciated that the described functionality and associated operators can be adapted to substantially any type of node-based query system or language.

In one aspect, the extended language functionality includes Expanded Sub-Node Predicate Semantics 210. In this example, XPath predicates placed on sub-nodes (nodes with a greater depth) of a node selected by the XPath where there is a 1:n relationship between the selected node and the sub-node return all n nodes if any of the n nodes meet the predicate criteria. Language extensions are provided to enable the following query semantics when using XPath over XML views:

Specific Sub-nodes—Return only the subset of the n nodes that meet the predicate criteria.

All Nodes—Return all n nodes only when all n nodes meet the predicate criteria.

At 220, Advanced Projection functionality can be provided. In this instance, XPath returns a sequence of nodes selected by the query as well as all the sub-nodes of each selected node including attributes and elements. Language extensions are provided when using XPath over XML views to easily restrict the sub-nodes that are returned as part of the results either by inclusion or exclusion. It should not be necessary to "re-build" the XML View in the XML query to get a non-default result as is currently the case with the XQuery language.

At 230, Computed Nodes functionality can be provided. For instance, XPath does not have any facility to extend the selected sequence of nodes or their sub-nodes with computed nodes (elements or attributes) that have content computed from the values of one or more other nodes. Language extensions in accordance with the subject invention extend the results of an XPath query with computed nodes without the need to "re-build" an XML View in the XML query as is currently the case with the XQuery language.

At 240, Node Grouping functionality can be provided. For example, XPath has no facility for re-grouping the sequence of nodes that is selected by the query. The selected nodes and all of its sub-nodes are returned in document order. Language extensions provided in accordance with the subject invention allow the user to re-group nodes by a property or properties in the ancestor or descendant hierarchy of the node in addition to the properties of the node itself. Node groups can be defined over any sequence of nodes.

At 250, Node Summary functionality can be provided. In addition to grouping nodes, language extensions should be provided to allow the user to calculate aggregate values across the members of a Node Group and provide a "summary node" to store that data. At 260, Result Sorting functionality can be provided. In this case, XPath has no facility for sorting the sequence of nodes that is selected by a respective query. The selected nodes and all of the sub-nodes are returned in document order. Language extensions should be provided to allow the user or system to sort the sequence of selected nodes as well as sorting sequences of sub-nodes. Partial sorting is allowed for semi-structured content models and the sort may be ascending or descending.

FIG. 3 illustrates example extension operators 300 in accordance with an aspect of the subject invention. The extension operators 300 are provided to augment conventional languages operating on hierarchical data collections. At 310 an Only operator is defined having the form Only ([predicate]). When a predicate is placed on a child node sequence of the node sequence that is selected by the XPath (or other language), the Only operator can be specified to return only the child nodes that meet the predicate criteria in the results.

At 320, an All operator is defined having the form All ([predicate]). When a predicate is placed on a child node sequence of the node sequence that is selected by the XPath, the All operator can be specified to return the selected node in the sequence only if all the child nodes in the sequence meet the predicate criteria.

At 330, the Project operator is defined having the form Project (TopNode, {SubPaths}) Project can be specified around a node selection to explicitly specify which sub-nodes should be returned by a query. The project operator takes a node and a list of relative paths from that node and excludes the list of nodes from the result. Excluding a node excludes all of its sub-nodes and multiple Project statements can be issued per query. Although all possible projections can be described by exclusion, real-world implementations of query extensions may include a syntactical shortcut for inclusion as well in cases where sub-nodes are excluded by default or the user only wants to return a small subset of the nodes described in the node hierarchy.

At 340, A Compute operator is defined having the form Compute (ResultPath, Expression). The ResultPath is where in an XML View the results of the computation are placed and the node type is determined by the return value of the function. The expression may be a simple function call such as multiplying the value of two numeric nodes however the expression may also be arbitrarily complex and allow for nested computation within the expression. User defined functions should also be allowed via an extension mechanism. One or more Compute expressions can be contained in the Extend clause.

At 350, A GroupBy operator is defined having the form GroupBy (GroupByScope, {GroupByPathList}). The GroupByScope defines the node sequence to group. One constraint is that the GroupByScope is at or below the depth in the hierarchy of the node that is selected by the query. The GroupByPathList selects the atomic node or nodes that define the group. All nodes in a sequence that are members of the group will be placed under a container node with simple type elements or attribute for each of the nodes selected in the GroupbyPathList that contain the values for the respective nodes that define the group. Summary attributes or elements can also be placed under the container node.

At 360, a Sort operator can be defined having the form Sort (SortScope, SortPathList, ASC|DSC). Similar to GroupBy, the SortScope defines the sequence of nodes to sort. One constraint is that the SortScope is at or below the depth in the hierarchy of the node that is selected by the query. Any level of hierarchy that does not receive a Sort extension can have the default sort (e.g., document order). The SortPathList selects the atomic node or nodes that define the sort order for sequence. The sort may be ascending (ASC) or descending (DSC) and partial sorting is also allowed.

Figure 4:
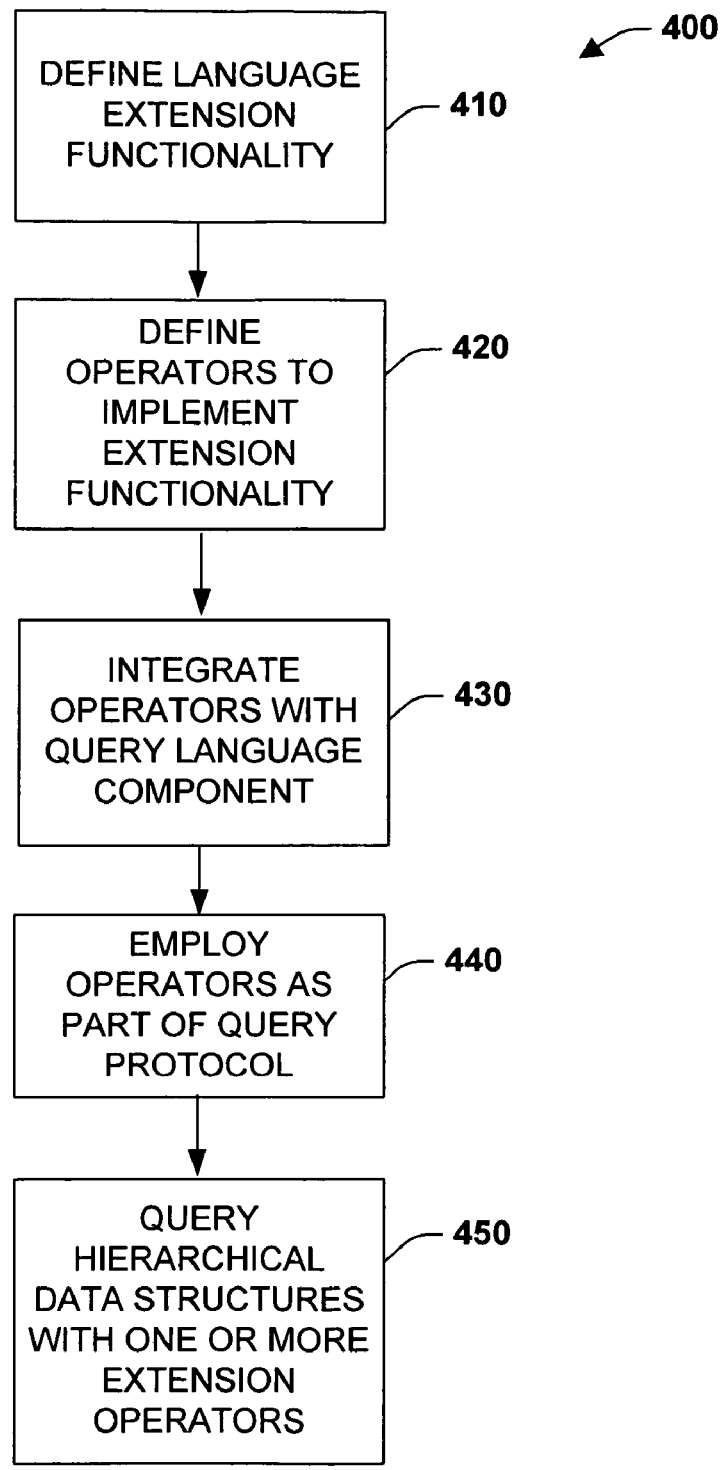
FIG. 4 is a flow diagram that illustrates example language extension methodology in accordance with an aspect of the subject invention.

FIG. 4 illustrates an example language extension methodology 400 in accordance with an aspect of the subject invention. While, for purposes of simplicity of explanation, the methodology is shown and described as a series or number of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Proceeding to 410, language extension functionality is defined. As noted above, this can include defining expanded sub-node predicate semantics, defining advanced projection functionality, defining computed node functionality, defining node grouping functionality, defining node summary functionality, and/or providing result sorting functionality. At 420, one or more operators are defined/constructed to implement the functionality described at 410. The operators can include such instructions as an Only operator to refine data searches to "only" those child nodes defined by a particular query, an All operator to return a selected node only if "all" the child nodes in a selected sequence meet a given predicate criteria, a Project operator to specify explicitly which sub-nodes should be returned by the query (inclusive or exclusive). Other include a Compute operator that enables data to be viewed and determined by a return value of a function, a GroupBy operator that defines a node sequence to a group, and a Sort operator that defines a sequence of nodes to sort.

At 430, the above defined operators are integrated with a query or general purpose programming language component. As noted above, this can include modifying a conventional language such as XPath, XQuery, or other node-based language to support the defined operators (e.g., modify a compiler to support the defined operators or instructions). At 440, the define operators which have been integrated with a query component or language can be employed as part of a language expression for querying a given node-based hierarchy for desired data output. At 450, the language expression utilizing the defined operators from 420 are employed to query a database and receive results in a desired format specified by the expression.

Figure 5:
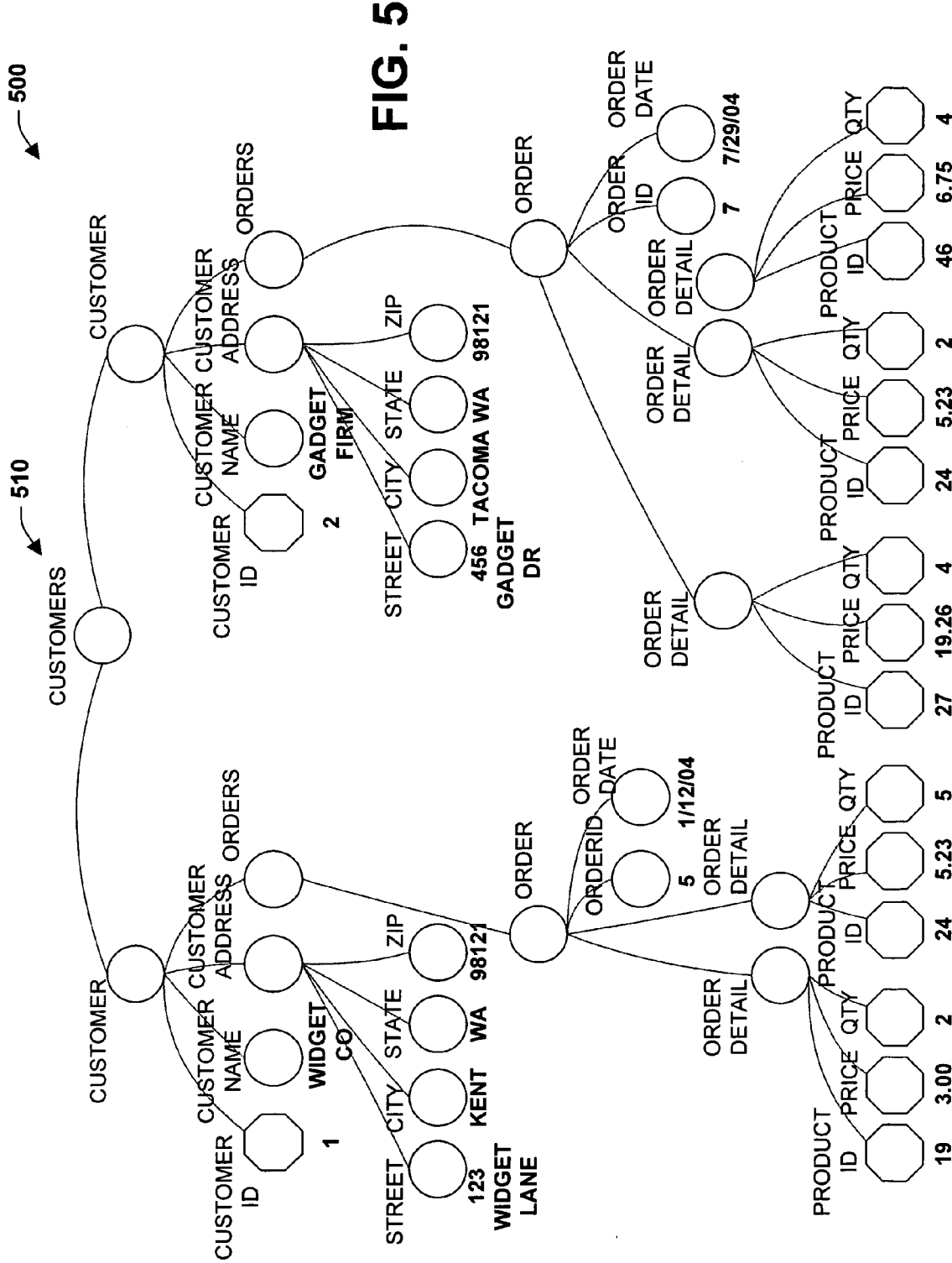
FIG. 5 illustrates an example node data collection in accordance with an aspect of the subject invention.

FIG. 5 illustrates an example node data collection in accordance with an aspect of the subject invention. Before proceeding, it is noted that FIG. 5 illustrates an example node-based hierarchy 500. FIGS. 6-11 then illustrate results from example queries that have been applied to the example structure 500. In this example, two customers appear under a node 510 called Customers, wherein the respective customers are associated with sub-nodes defining accounts for the customers. Data below the respective customer nodes represent such aspects as customer IDs, customer names, customer addresses, and previous customer order information. Data from these respective categories can be further sub-divided such as an order being sub-divided into Product IDs, price, and quantities.

The example in FIG. 5 shows a traditional XPath query in view of an "enhanced" XPath query resulting in FIGS. 6-11 to show the increased power gained by leveraging the extensions described above. The syntax used to demonstrate the new query operators is for example display purposes. As can be appreciated, different syntaxes can be provided with identical or other semantics based on user requirements for compactness, readability, and so forth. The examples work off the simple tree structure depicted in FIG. 5. Element nodes are represented by circles and attribute nodes are represented by octagons.

Figure 6:
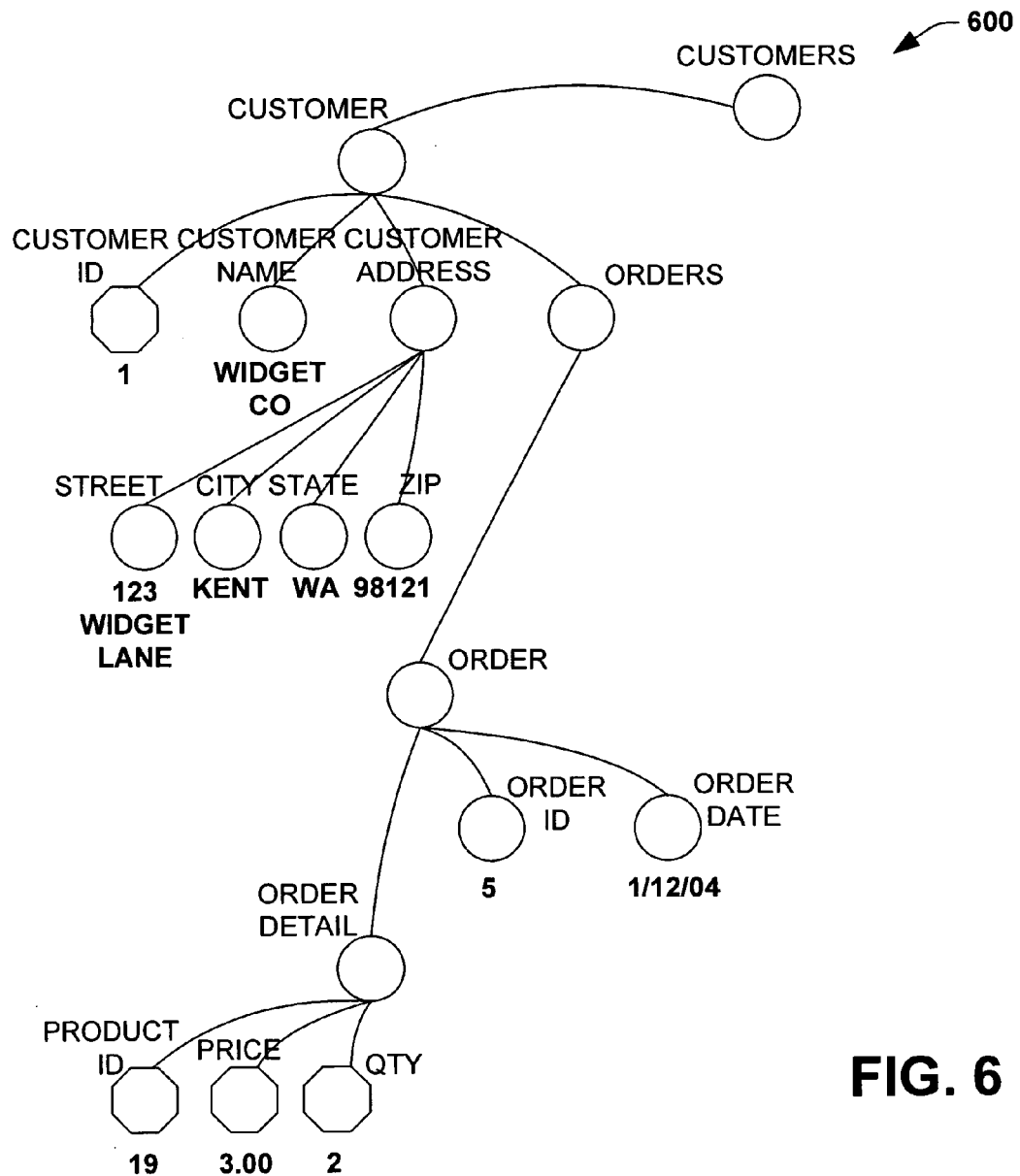
FIG. 6 illustrates an example node data collection processed by an "Only" operator in accordance with an aspect of the subject invention.

FIG. 6 illustrates an example node data collection 600 processed by an "Only" operator in accordance with an aspect of the subject invention. In this aspect, the tree depicted in FIG. 5 is processed by the following instruction: /Customers Only([Customer/Orders/Order[@OrderID="5"]/OrderDetail/ProductID="19"]) and returns the results depicted in FIG. 6.

Figure 7:
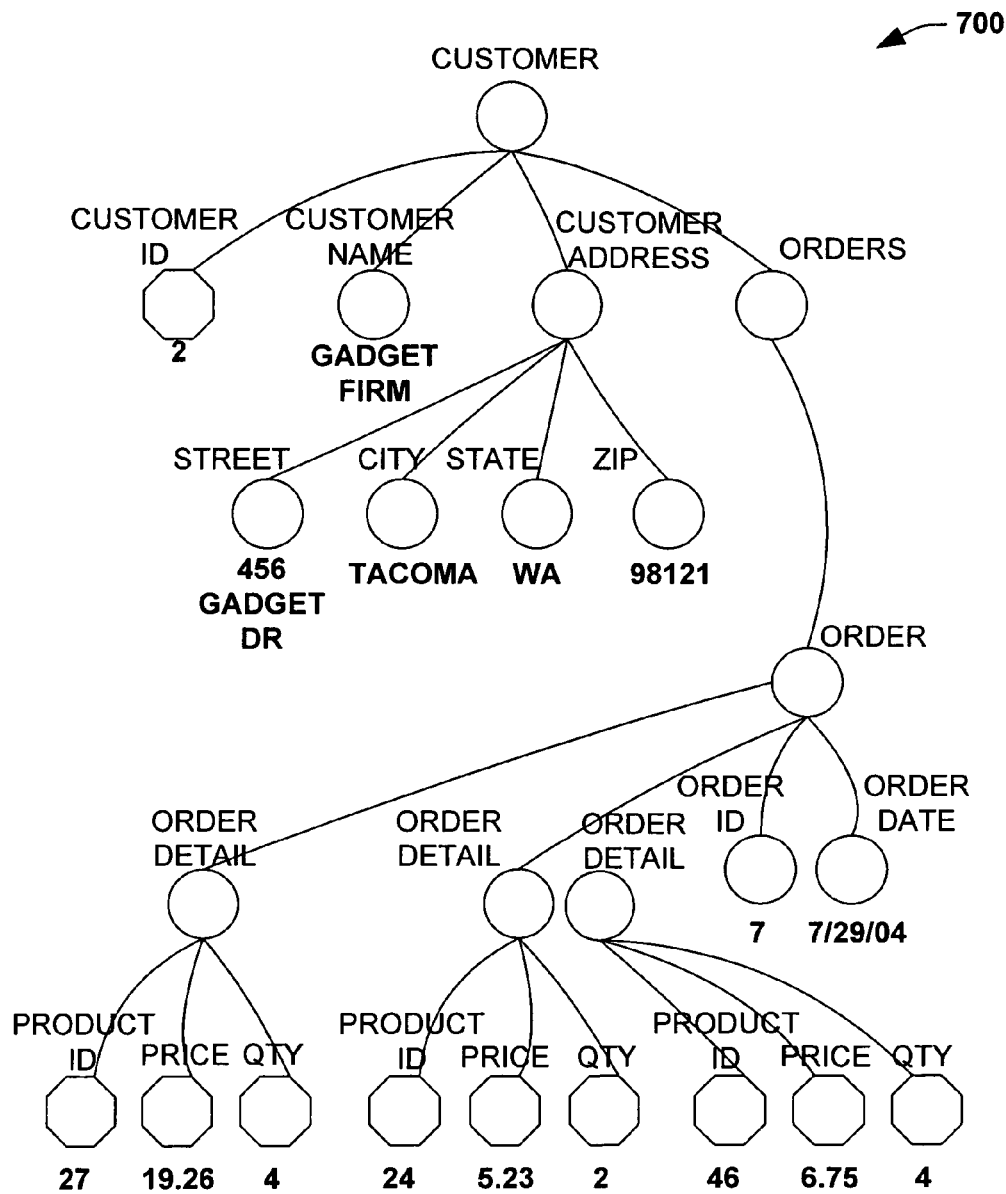
FIG. 7 illustrates an example node data collection processed by an "All" operator in accordance with an aspect of the subject invention.

FIG. 7 illustrates an example node data collection 700 processed by an "All" operator in accordance with an aspect of the subject invention. In this aspect, the tree depicted in FIG. 5 is processed by the following expression and returns only the orders where all the OrderDetails elements satisfies the condition that Price is greater than 5: /Customers/Customer All(Orders/Order/OrderDetail/@Price>5) and returns the result depicted in FIG. 7.

Figure 8:
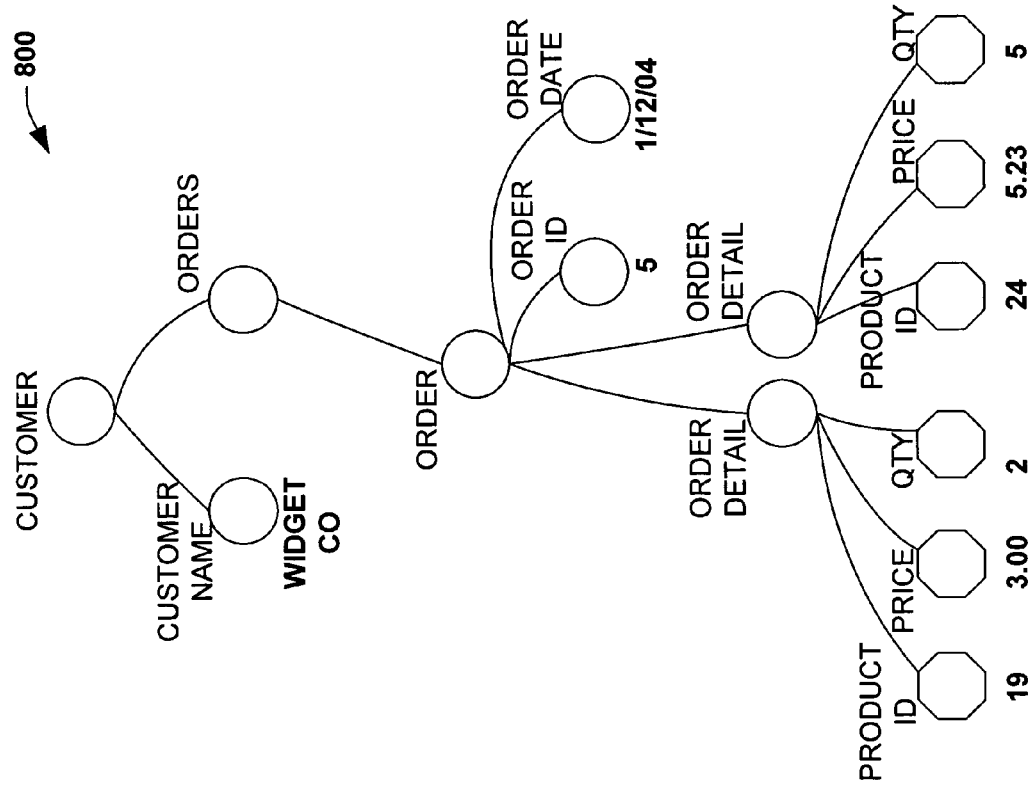
FIG. 8 illustrates an example node data collection processed by an "Exclude" operator in accordance with an aspect of the subject invention.

FIG. 8 illustrates an example node data collection 800 processed by an "Exclude" operator in accordance with an aspect of the subject invention. In this example, the tree depicted in FIG. 5 is processed by the following expression that removes a CustomerID from the return list while still allowing it to be used in the predicate /Customers/Customer [@CustomerID="1"] Exclude(@CustomerID, /CustomerAddress). The attribute CustomerID and the element CustomerAddress are not returned in the result document.

Figure 9:
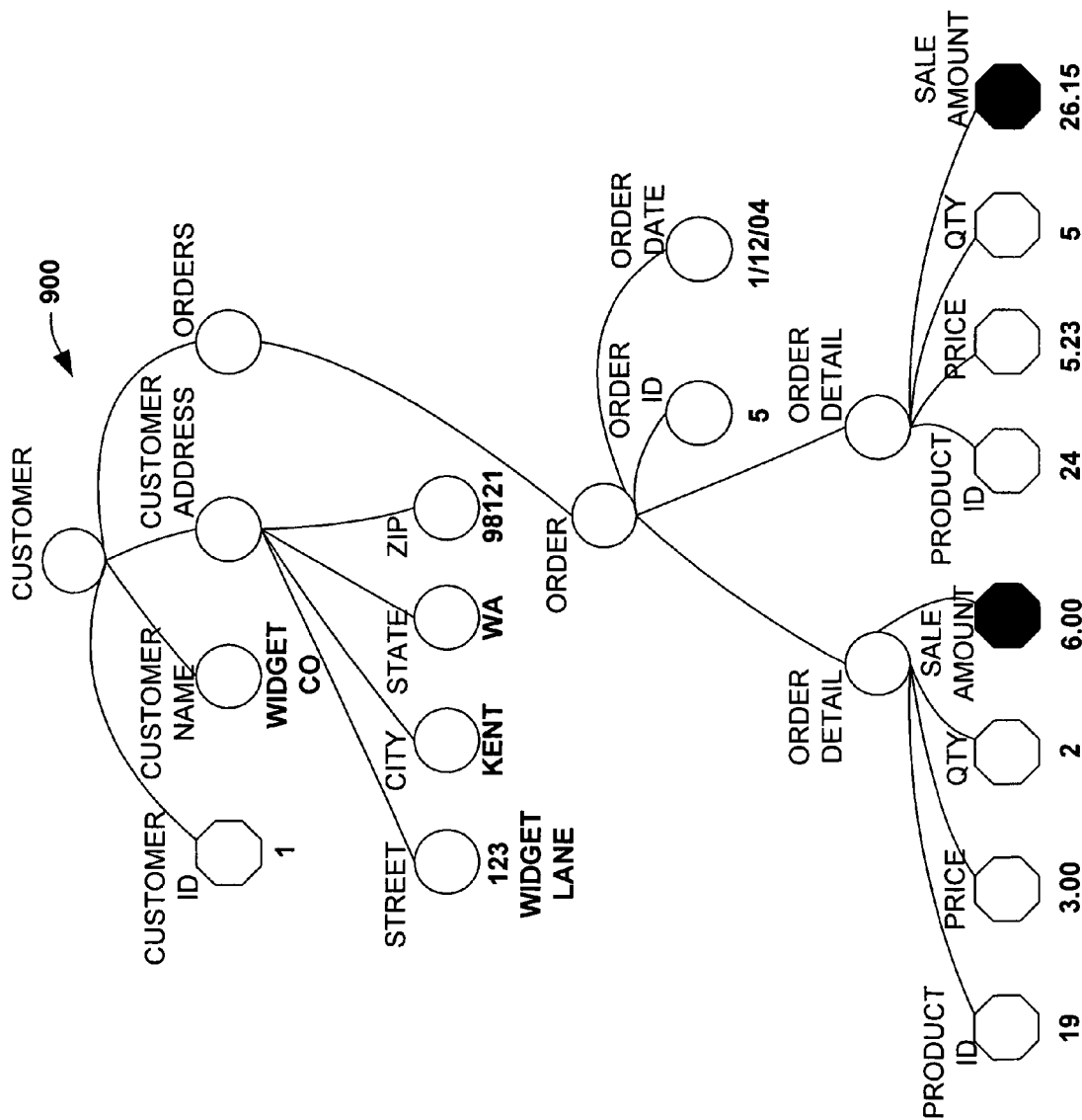
FIG. 9 illustrates an example node data collection processed by a "Compute" operator in accordance with an aspect of the subject invention.

FIG. 9 illustrates an example node data collection 900 processed by a "Compute" operator in accordance with an aspect of the subject invention. In this example, the following expression adds a SaleAmount attribute to an OrderDetail node. This attribute contains the results of Qty*Price. /Customers/Customer[@CustomerID=1]Compute(Orders/Order/OrderDetail/@SaleAmount, Orders/Order/OrderDetail/@Price*Orders/Order/OrderDetail/@Qty)

The results are depicted as the data structure 900.

Figure 10:
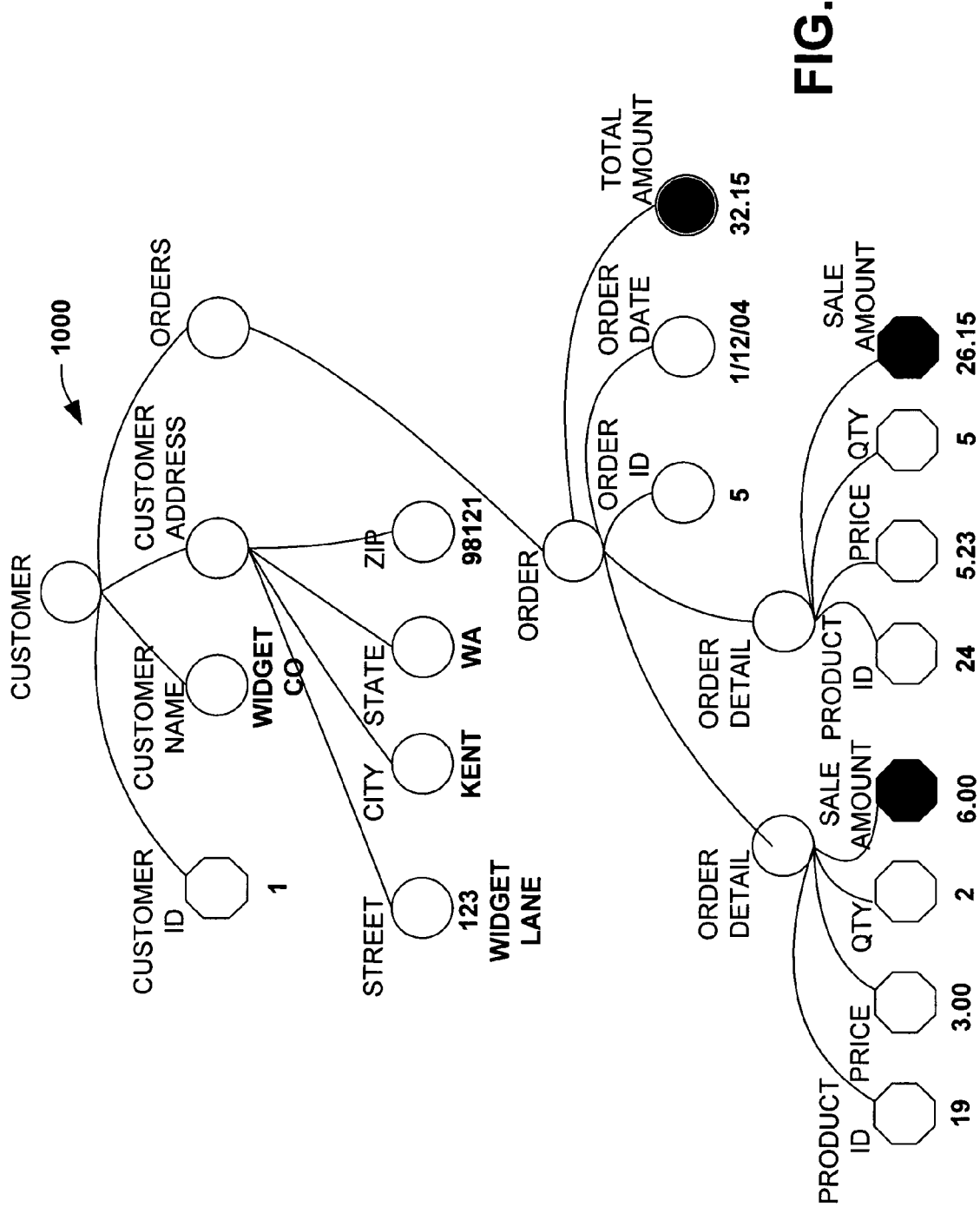
FIG. 10 illustrates an example node data collection processed by a more complex "Compute" operation in accordance with an aspect of the subject invention.

FIG. 10 illustrates an example node data collection 1000 processed by a more complex "Compute" operation in accordance with an aspect of the subject invention. In this example, a more complex computation is illustrated adding a summary node to an order that contains the sum of all the OrderDetail's new attribute @SaleAmount. The following expression: /Customers/Customer[@CustomerID=1] Compute(Orders/Order/@TotalAmount, Sum(Compute(Orders/Order/OrderDetail/@SaleAmount, Orders/Order/OrderDetail/@Price*Orders/Order/OrderDetail/@Qty))) adds the TotalAmount attribute to the Order element which holds the sum of the SaleAmount attribute on the OrderDetail element as depicted by the data collection 1000.

Figure 11:
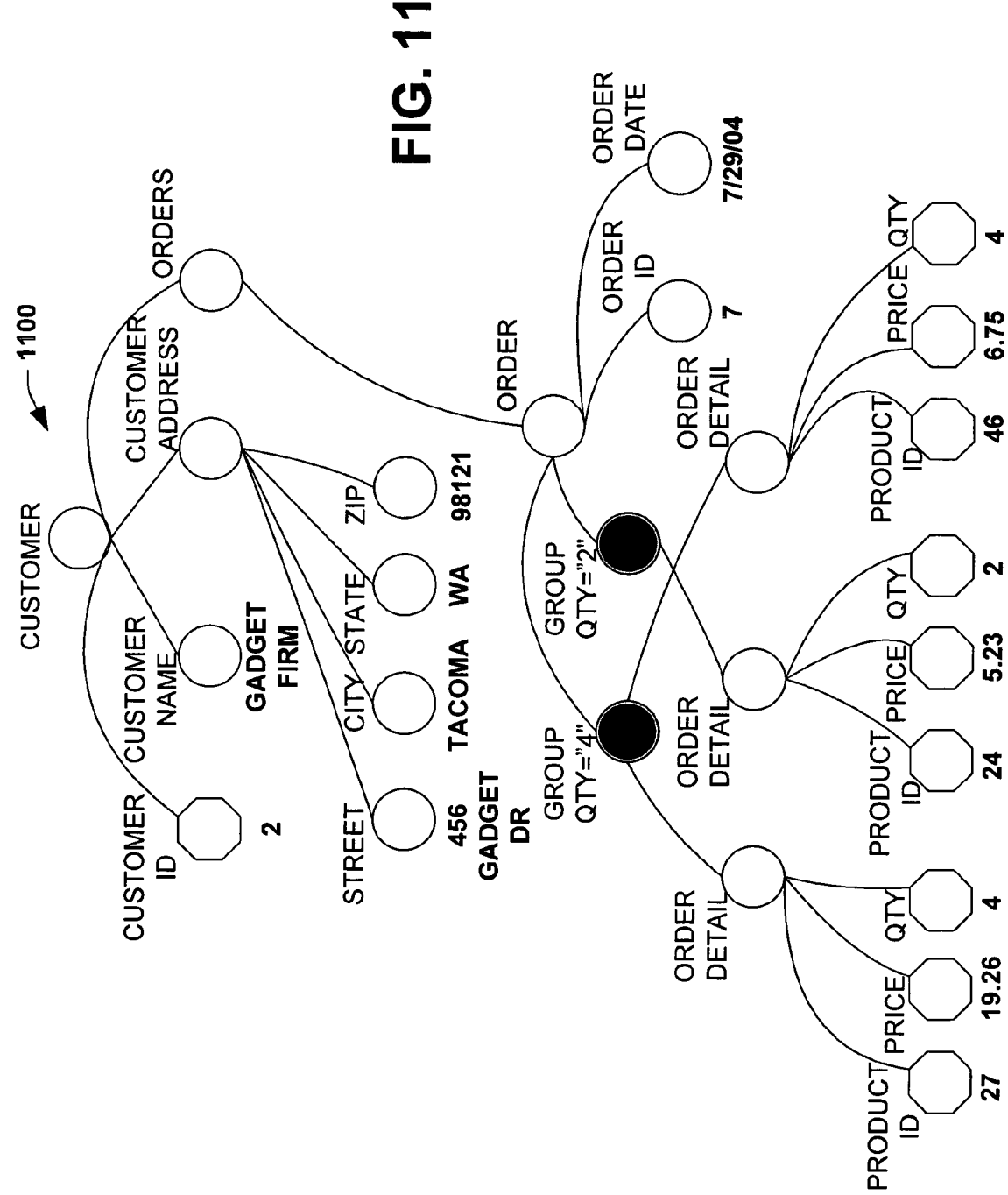
FIG. 11 illustrates an example node data collection processed by a "GroupBy" operator in accordance with an aspect of the subject invention.

FIG. 11 illustrates an example node data collection 1100 processed by a "GroupBy" operator in accordance with an aspect of the subject invention. In this example, the following instruction groups OrderDetail elements by a Qty attribute: /Customers/Customer[@CustomerId="2"]GroupBy(Customer/Orders/Order/OrderDetail, {Customer/Orders/Order/OrderDetail/@Qty}) that results in the data collection 1100. In another example for Sort (SortScope, SortPath, ASC|DSC), the following example instructions sorts customers based on their city as illustrated in the following expression: /Customers Sort (Customer, Customer/CustomerAddress/@City, ASC) results in the following example XML (Note that the customer who lives in Kent is first):

<Customers>

<Customer CustomerID="1" CustomerName="Widget Co">

<CustomerAddress Street="123 Widget lane" City="Kent" State="WA" Zip="98121"/>

</Customer>

<Customer CustomerID="2" CustomerName="Gadget Firm">

<CustomerAddress Street="456 Gadget Dr" City="Tacoma" State="WA" Zip="98121"/>

</Customer>

</Customers>

If the sort expression is changed to be descending the result changes as follows:

<Customers>

<Customer CustomerID="2" CustomerName="Gadget Firm">

<CustomerAddress Street="456 Gadget Dr" City="Tacoma" State="WA" Zip="98121"/>

</Customer>

<Customer CustomerID="1" CustomerName="Widget Co">

<CustomerAddress Street="123 Widget lane" City="Kent" State="WA" Zip="98121"/>

</Customer>

</Customers>

Figure 12:
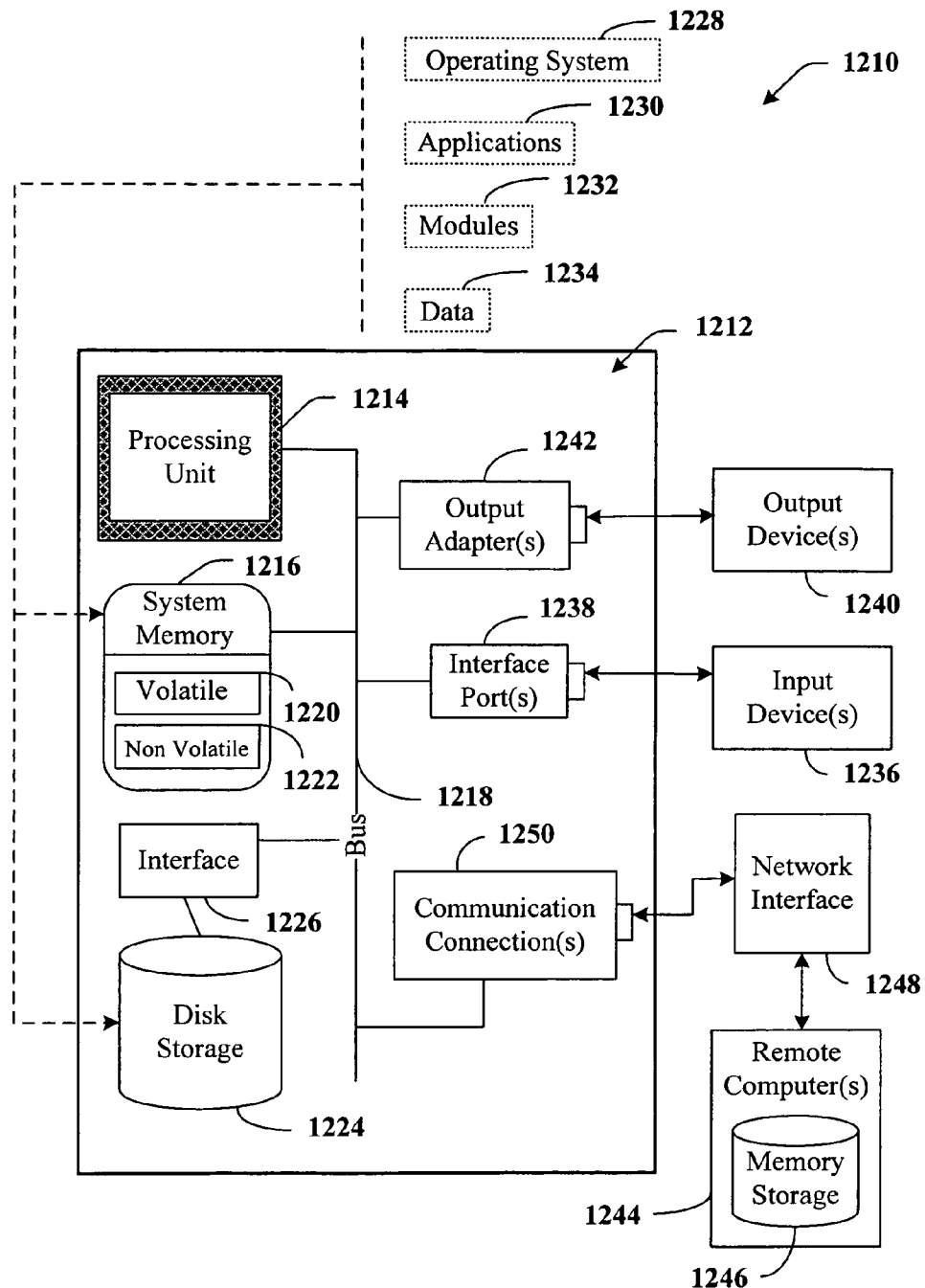
FIG. 12 is a schematic block diagram illustrating a suitable operating environment in accordance with an aspect of the subject invention.

With reference to FIG. 12, an exemplary environment 1210 for implementing various aspects of the invention includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multi-processor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable ROM (EEPROM), or flash memory. Volatile memory 1220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the subject invention can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, that require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

Figure 13:
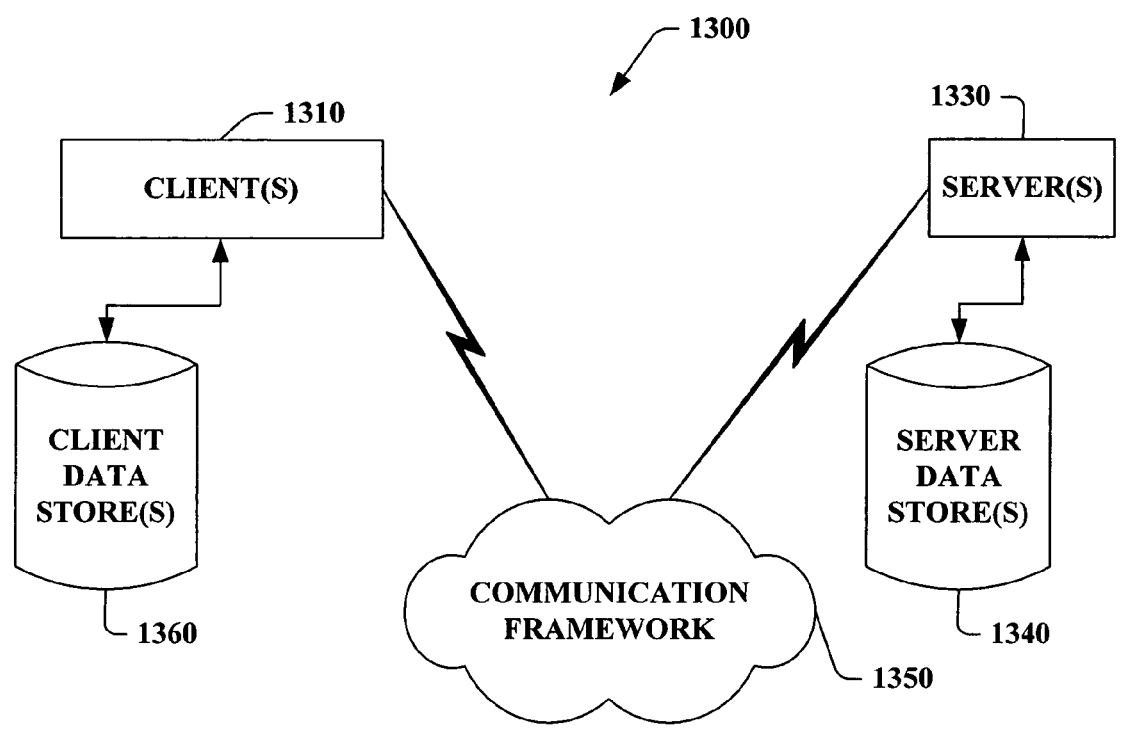
FIG. 13 is a schematic block diagram of a sample-computing environment with which the subject invention can interact.

FIG. 13 is a schematic block diagram of a sample-computing environment 1300 with which the subject invention can interact. The system 1300 includes one or more client(s) 1310. The client(s) 1310 can be hardware and/or software (e.g., threads, processes, computing devices). The system 1300 also includes one or more server(s) 1330. The server(s) 1330 can also be hardware and/or software (e.g., threads, processes, computing devices). The servers 1330 can house threads to perform transformations by employing the subject invention, for example. One possible communication between a client 1310 and a server 1330 may be in the form of a data packet adapted to be transmitted between two or more computer processes. The system 1300 includes a communication framework 1350 that can be employed to facilitate communications between the client(s) 1310 and the server(s) 1330. The client(s) 1310 are operably connected to one or more client data store(s) 1360 that can be employed to store information local to the client(s) 1310. Similarly, the server(s) 1330 are operably connected to one or more server data store(s) 1340 that can be employed to store information local to the servers 1330.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A programming language system, comprising a processor that executes the following computer-executable components:
    a query component to interact with hierarchical node-based data collections; and
    a language extension component to augment the query component to facilitate interactions with the node-based data collections, the language extension component supplies functions to filter the data collections at a granular level, re-shape the data collections, sort the data collections, and extend the data collections with computed nodes, wherein the functions include an extended sub-node predicate function, an advanced projection function, a computed node function, a node grouping function, a node summary function, and a result sorting function.

2. The system of claim 1, the extended sub-node predicate function returns only a subset of n nodes that meet a predicate criteria or returns all n nodes only when all n nodes meet the predicate criteria, n being an integer.

3. The system of claim 1, the advanced projection function restricts sub-nodes that are returned as part of results by inclusion or exclusion.

4. The system of claim 1, the computed node function extends results of a query with computed nodes that compute values from one or more other nodes to determine the results.

5. The system of claim 1, the node grouping function allows a user or system to re-group nodes by a property or properties in an ancestor or descendant hierarchy of the nodes.

6. The system of claim 1, the node summary function allows a user or system to sort a sequence of selected nodes or sort sequences of sub-nodes.

7. The system of claim 1, the functions include at least one of the following operators: an Only operator, an All operator, a Project operator, a Compute operator, a GroupBy operator, and a Sort operator.

8. The system of claim 7, the Only operator is specified to return only child nodes that meet predicate criteria in returned results.

9. The system of claim 7, the All operator is specified to return a selected node in a sequence of nodes only if all child nodes in the sequence meet a predicate criteria.

10. The system of claim 7, the Project operator is specified about a node selection to explicitly specify which sub-nodes are to be returned by a query.

11. The system of claim 7, the Compute operator enables results of a computation to be determined via one or more other nodes and a node type determined by a return value of a function, the computation enables nested computations within an expression.

12. The system of claim 7, the GroupBy operator defines a node sequence for a group.

13. The system of claim 7, the Sort operator defines a sequence of nodes to sort.

14. A computer readable medium having computer readable instructions stored thereon that, when executed by a processor, because the processor to carry out the following acts:
    querying a hierarchical data collection; and
    supplying functions to augment the querying wherein (a) at least one of the functions filters the hierarchical data collection at a granular level, at least one of the functions reshapes the hierarchical data collection, at least one of the functions sort the hierarchical data collection, and at least one of the functions extends the hierarchical data collection with nodes, and (b) the functions include an extended node predicate function, an advanced projection function, a computed node function, a node grouping function, a node summary function, and a result sorting function; and
    manipulating the hierarchical data collection through operators that support functionality of the supplied functions.

15. A method, comprising:
    employing at least a processor to execute code instructions stored in a computer-readable medium, the code instructions when executed by at least the processor effect the following acts:
    querying a hierarchical collection of nodes; and
    supplying functions to augment the querying, wherein the functions (a) provide at least one of filtering the hierarchical collection of nodes, re-shaping the hierarchical collection of nodes, sorting the hierarchical collection of nodes, and extending the hierarchical collection of nodes with content computed from one or more nodes in the hierarchical collection of nodes, and (b) include an extended sub-node predicate function, an advanced projection function, a computed node function, a node grouping function, a node summary function, and a result sorting function; and manipulating the hierarchical collection of nodes through operators that support functionality of supplied functions, wherein the operators comprise:

an Only operator that returns only child nodes that meet predicate criteria in returned results to a query;

an All operator that returns a selected sequence of nodes only if all child nodes in the sequence meet a predicate criteria;

a Project operator specified about a node selection, the operator explicitly specifies which sub-nodes are to be returned by a query;

a Compute operator that enables results of a computation to be determined via one or more other nodes and a node type determined by return value of an expression, the expression allows for nested computation and is user-defined;

a GroupBy operator that defines a node sequence for a group; and a Sort operator that defines a sequence of nodes to sort.

16. The method of claim 15, the extended sub-node predicate function returns only a subset of n nodes that meet a predicate criteria or returns all n nodes only when all n nodes meet the predicate criteria, n being an integer.

17. The method of claim 15, the advanced projection function restricts sub-nodes that are returned as part of results by inclusion or exclusion.

18. The method of claim 15, the computed node function extends results of a query with computed nodes that compute values from one or more other nodes to determine the results.

19. The method of claim 15, the node grouping function allows a user or system to re-group nodes by a property or properties in an ancestor or descendant hierarchy of the nodes.

20. The method of claim 15, the node summary function allows a user or system to sort a sequence of selected nodes or sort sequences of sub-nodes.

* * * * *